United States Patent [19]

Forman

[11] Patent Number: 5,467,906
[45] Date of Patent: Nov. 21, 1995

[54] CAMERA BICYCLE

[76] Inventor: Mark L. Forman, 300 W. 23rd St., New York, N.Y. 10011

[21] Appl. No.: 930,330

[22] Filed: Aug. 17, 1992

[51] Int. Cl.[6] .................................................. B62J 11/00
[52] U.S. Cl. ............................. 224/39; 224/908; 352/132
[58] Field of Search ............................... 224/39, 41, 908; 352/132; 354/76, 81

[56] References Cited

U.S. PATENT DOCUMENTS

| | | | |
|---|---|---|---|
| 633,386 | 9/1899 | Marley | 224/39 R |
| 4,562,944 | 1/1986 | Jackson et al. | 224/39 |
| 4,699,484 | 10/1987 | Howell et al. | 352/132 |
| 4,754,901 | 7/1988 | Villanueva et al. | 224/41 |

*Primary Examiner*—Renee S. Luebke
*Attorney, Agent, or Firm*—Stephen E. Feldman

[57] ABSTRACT

A camera mounting assembly for a bicycle having a steering head and a seat post comprising two elongated beam members and support mounting members for mounting the beam members horizontally on the bicycle between the head and post. A camera mounting member is secured to the beam members by connecting members which permit selective securing of the camera mounting member in the direction of the elongation of the beam members. Additionally a stem mount for mounting a camera on the stem portion of the bicycle is provided which comprises a bracket having a plate portion and a C-shaped member connected to the ends of the plate.

10 Claims, 6 Drawing Sheets

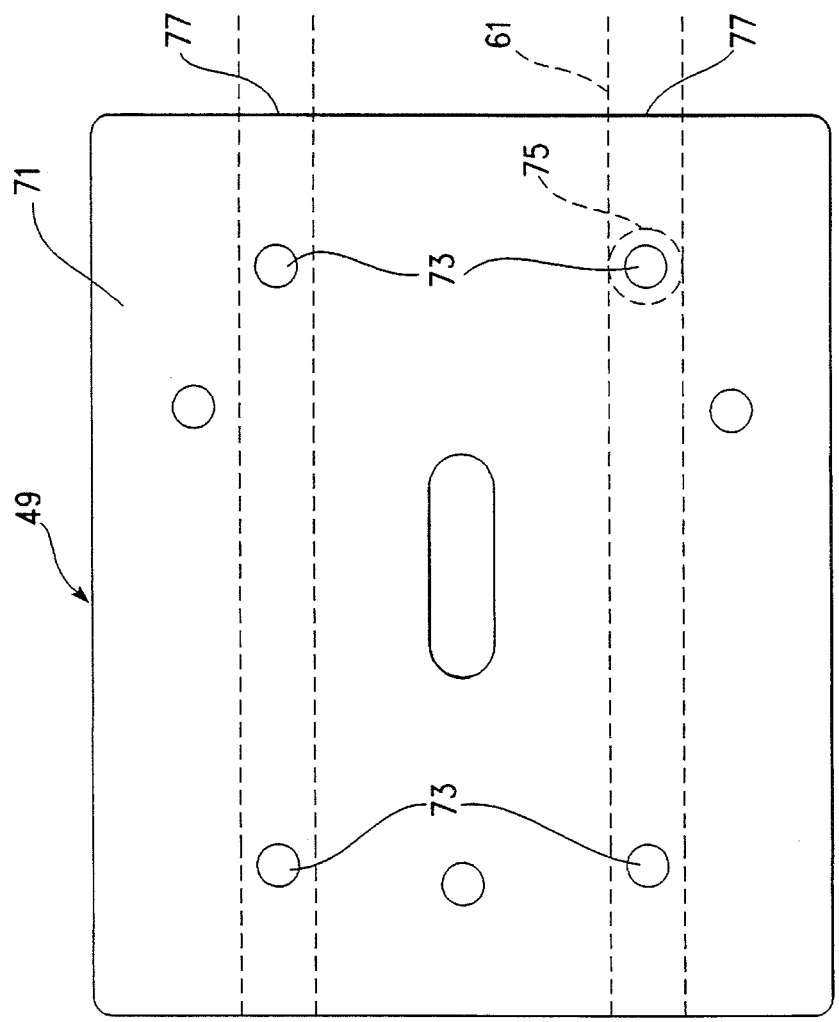
Fig. 3
Fig. 4
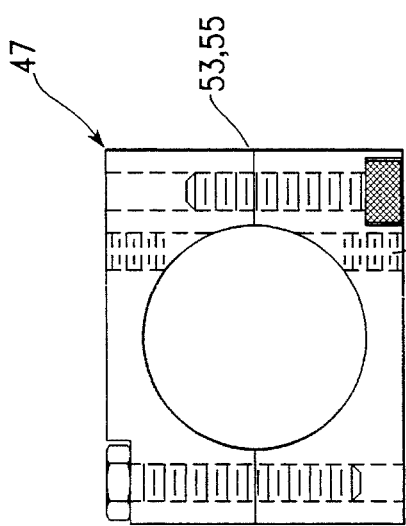
Fig. 2a
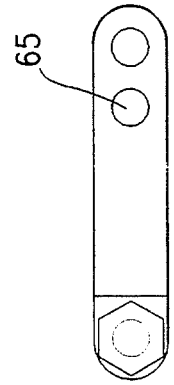
Fig. 2b
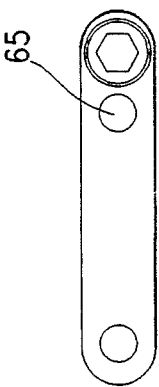
Fig. 2c

CAMERA BICYCLE

FIELD OF THE INVENTION

This invention relates to a camera mounting assembly for a bicycle. It has two lightweight beams which are fixed to the sides of a bicycle and which beams mount a camera mounting member. It is characterized by its ability to provide closer camera shots and is able to take shots which motor vehicles are unable to take.

BACKGROUND OF THE INVENTION

A camera mounting assembly for a bicycle must satisfy certain requirements, such as low cost, ease of assembly, ease of attachment and removal of the camera, having numerous possible attachment positions and the ability to minimize vibration.

U.S. Pat. No. 665,480 to Softley discloses a camera carrier for a bicycle comprising a plate secured to a frame by clamps. The plate has a sleeve which carries a plurality of legs.

U.S. Pat. No. 4,798,318 to Irwin discloses a bicycle handlebar carrier bag comprising a bracket fastened to the handlebars, and a bag of flexible material having a rigid frame received within the bag, which frame has an attachment portion received by the bracket.

OBJECTS OF THE INVENTION

It is therefore one of the objects of the present invention to provide a camera mounting assembly for a bicycle which permits safer and much closer camera shots than a motor vehicle can achieve.

It is another object of the present invention to provide a camera mounting assembly which obviates the necessity of motor vehicles and which results in no pollution, which would otherwise be offensive to actors or athletes.

It is a further object of the present invention to provide a camera mounting assembly which is particularly useful for making camera shots such as running chase sequences, very fast dolly shots, running with or without dialogues, shots on narrow paths or sidewalks, sports events and sequences where motor vehicles are not feasible or not allowed.

BRIEF DESCRIPTION OF DRAWING FIGURES

FIG. 2a is a side elevation view of a clamp used in the assembly of FIG. 1;

FIG. 2b is a top view of the clamp of FIG. 2a;

FIG. 2c is a bottom view of the clamp of FIG. 2a;

FIG. 3 is a top plan view of the camera mounting means of the assembly of FIG. 1;

FIG. 4 is a top plan view of a stiffener used in the assembly of FIG. 1;

FIG. 8b is a bottom view of the stem mount of FIG. 8a; and

FIG. 8c is a side elevation view of the stem mount of FIG. 8a.

DESCRIPTION OF THE INVENTION

Figure 1:
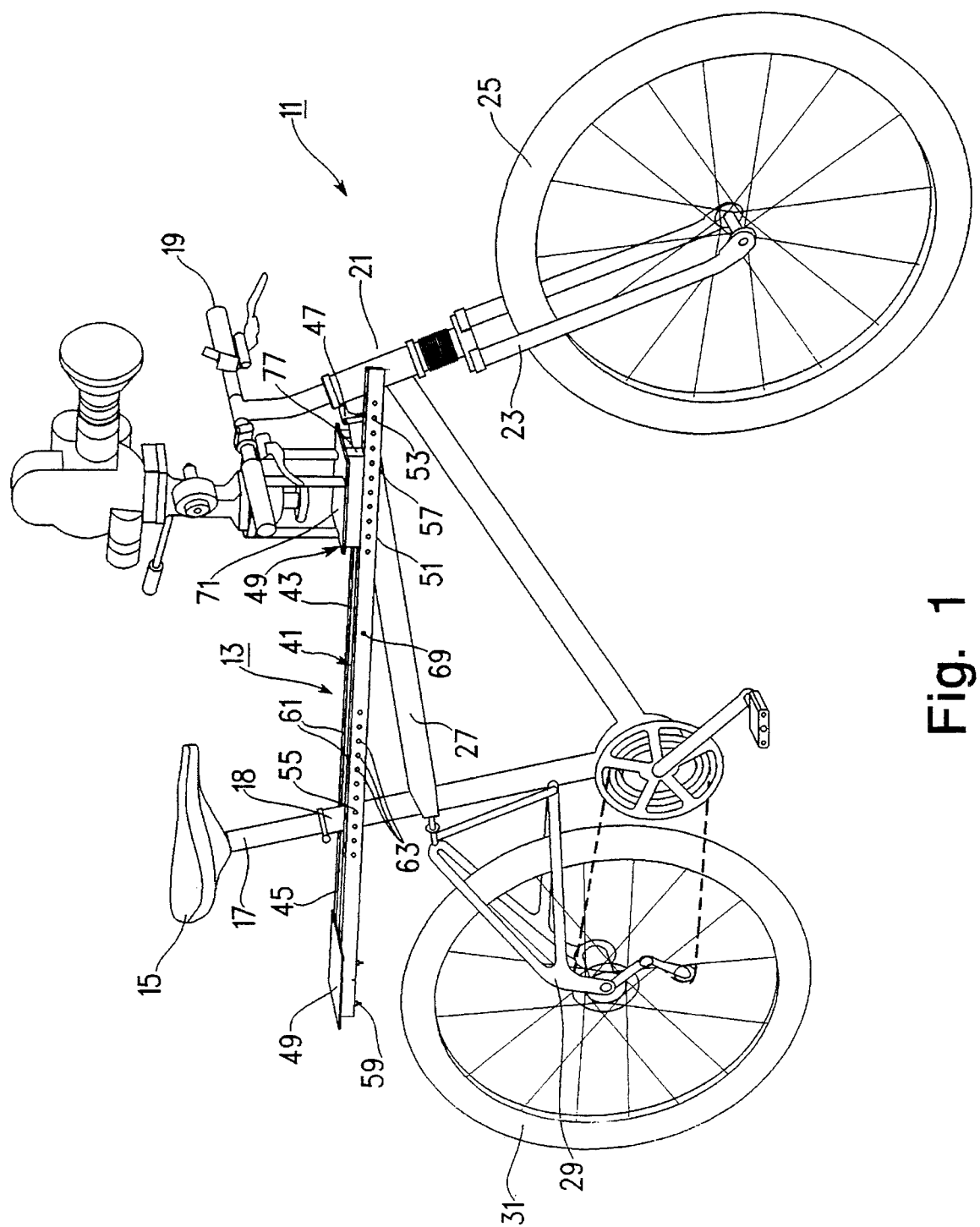
FIG. 1 is a perspective view of a camera mounting assembly attached to a bicycle according to the invention.

In the first of the preferred embodiments illustrated in FIG. 1, reference numeral 11 generally designates a bicycle upon which is mounted a camera mounting assembly generally designated by reference numeral 13. The bicycle 11, comprises a seat 15 disposed upon a seat post 17, seat tube 18, handle bars 19, steering head 21, front wheel suspension means 23, front wheel 25, top tube 27, rear wheel suspension means 29 and rear wheel 31. The front suspension 23 uses a hydraulically damped fork with four inches of travel and the rear suspension 29 uses a hydraulically damped swing arm with 3" of travel. The camera mounting assembly 13 comprises an elongated supporting means 41 having a central portion 43 and a rear portion 45; the central portion 43 extends between the steering head 21 and the seat post 17 and the rear portion 45 extends rearwardly from the seat post 17 over the rear wheel 31. The camera mount assembly 13 further comprises support mounting means 47, removable camera mounting means 49, and connecting means 51 for selectively securing the camera mounting means 49 on a portion of the supporting means 41 in the direction of the elongation thereof. The support mounting means 47, comprise two identical clamps 53 and 55 FIGS. 2a, 2b and 2c), the first of which, 53, is mounted near said steering head 21 on said top tube 27, and the second of which, 55, is mounted near said seat post 17 on said seat tube 18. The clamps 53 and 55 mount the supporting means 41 in a substantially horizontal position on the bicycle 11. Two camera mounting means 49 are connected to said supporting means 41, one on the forward section of said central portion 43 by forward connecting means 57, and a second on the rear portion 45 by rear connecting means 59. The supporting means 41 comprise two elongated aluminum beam means or members 61, spaced apart from one another and disposed parallel to one another on both sides of the frame of the bicycle 11. The beam members 61 includes a plurality of horizontal apertures 63 longitudinally extending across said beam members 61 and the beam members 61 are secured to the bicycle 11 through identical clamps 53 and 55 (FIG. 2) through the use of conventional support mounting means 47 such as ALLEN bolts (not shown) connected through said apertures 63 into apertures 65 extending through the clamps 53 and 55. Stiffeners (not shown) in the form of solid elongated cylindrically shaped members are disposed between said beam members 61 and are secured thereto through apertures 69 by conventional screw means. Referring now to FIG. 3 wherein the camera mounting means 49 is illustrated, it comprises a flat plate member 71 having a ⅜ slotted mount and a 100 mm ball mount as well as four apertures 73 extending therethrough, through which connecting means 51, conventional bolts, are disposed and which extend through vertical apertures 75 formed in said beam members 61, and which are secured at its end by conventional nuts. The plate member 71 which is mounted on the forward section of the central portion 43 of the beam members 61 is mounted through a pair of spacer members 77. The plate member 71 mounted on the rear portion 45 of the beam members 61 is directly connected thereto, but connected at its underside through a pair of transversely extending stiffeners 79 (FIG. 4).

Figure 5:
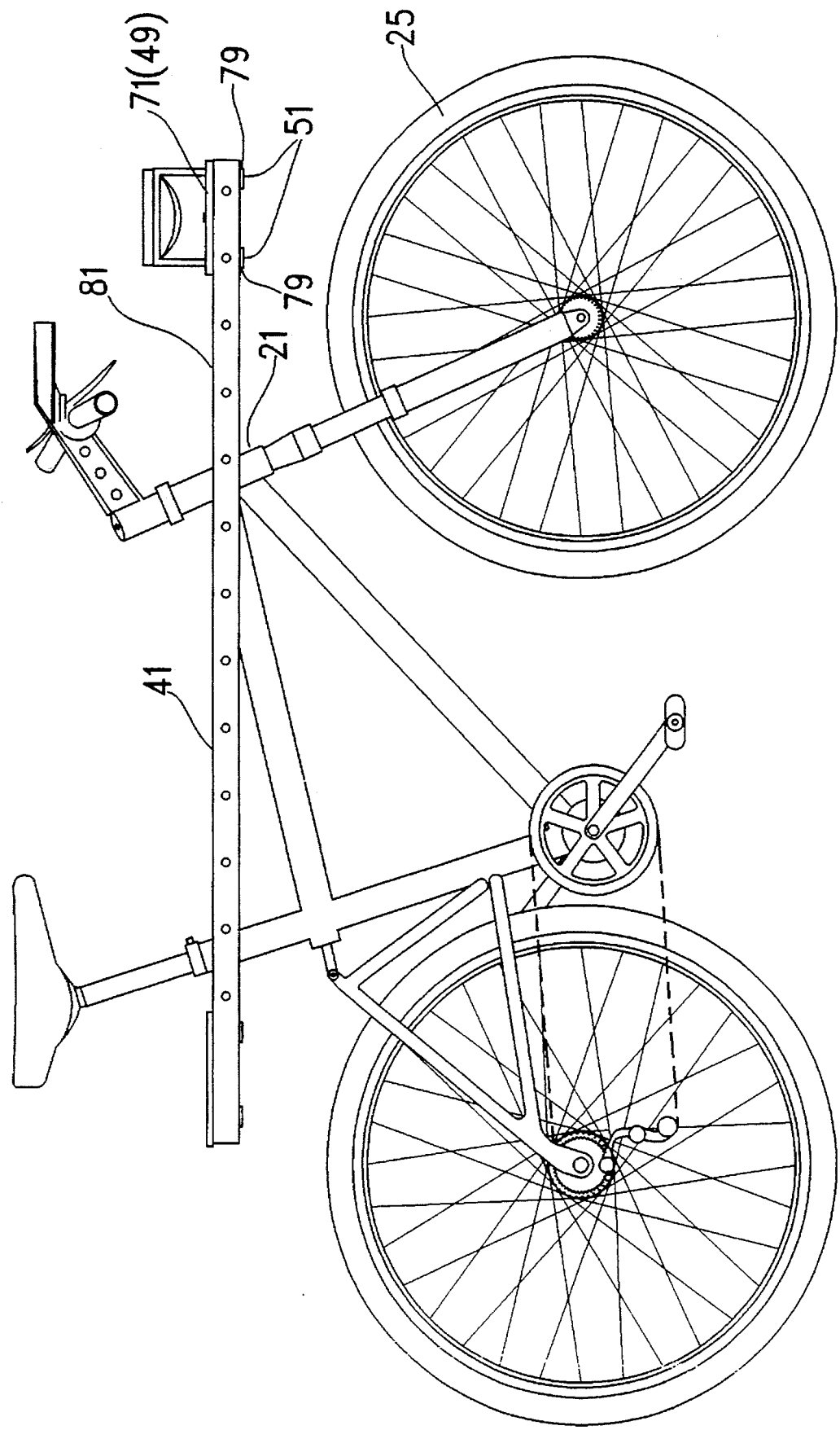
FIG. 5 is a side view of a second embodiment of a camera assembly attached to a bicycle according to the invention.

Referring now to FIG. 5, a second embodiment is illustrated, which embodiment comprises supporting means 41 having a front portion 81 extending frontwardly from said steering head 21 over said front wheel 25 and wherein a camera mounting means 49 in the form of a plate member 71 is secured through a pair of stiffeners 79 by connecting means 51.

Figure 6:
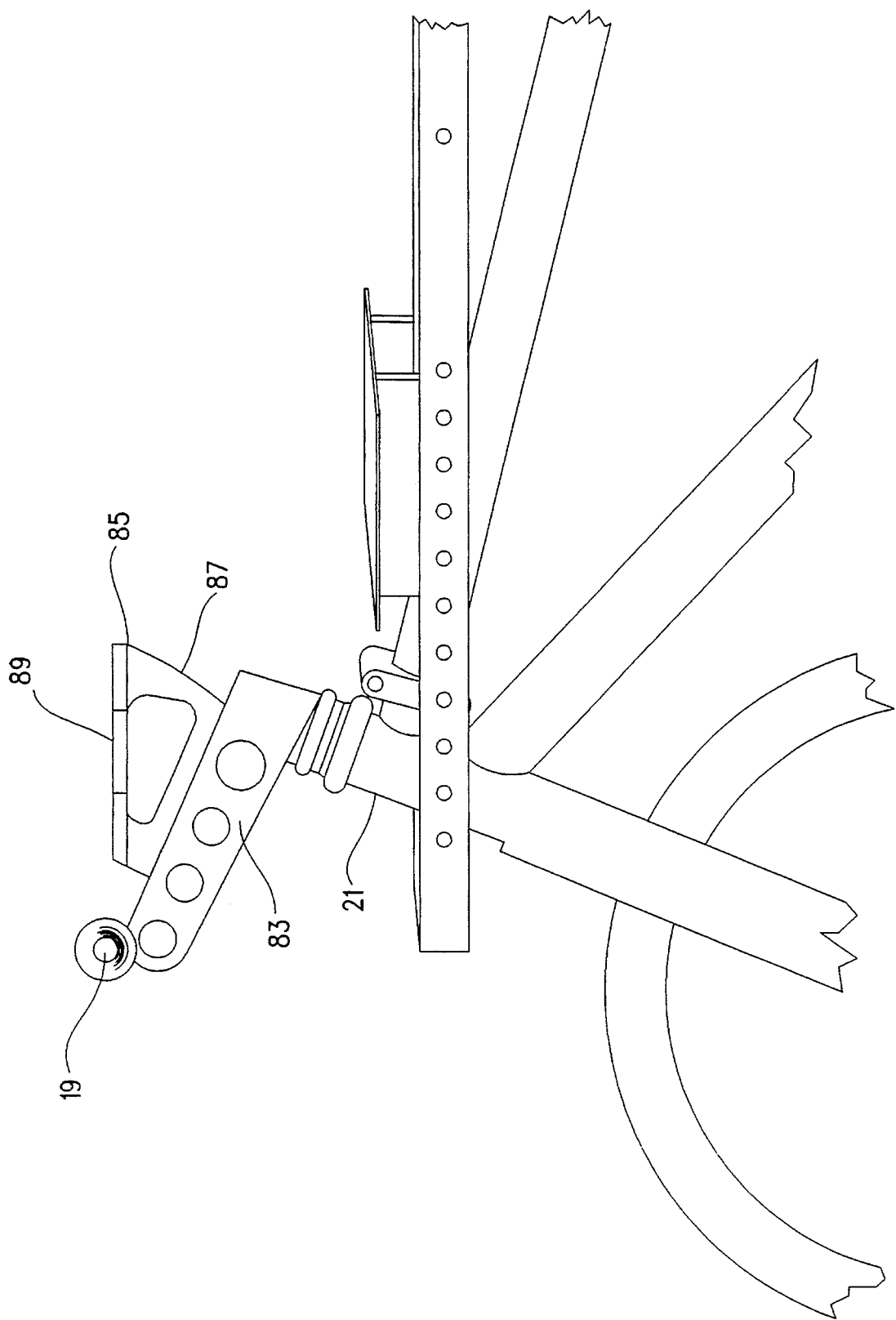
FIG. 6 is a side view of a stem mount for mounting a camera on the stem of a bicycle according to the invention.
Figure 7:
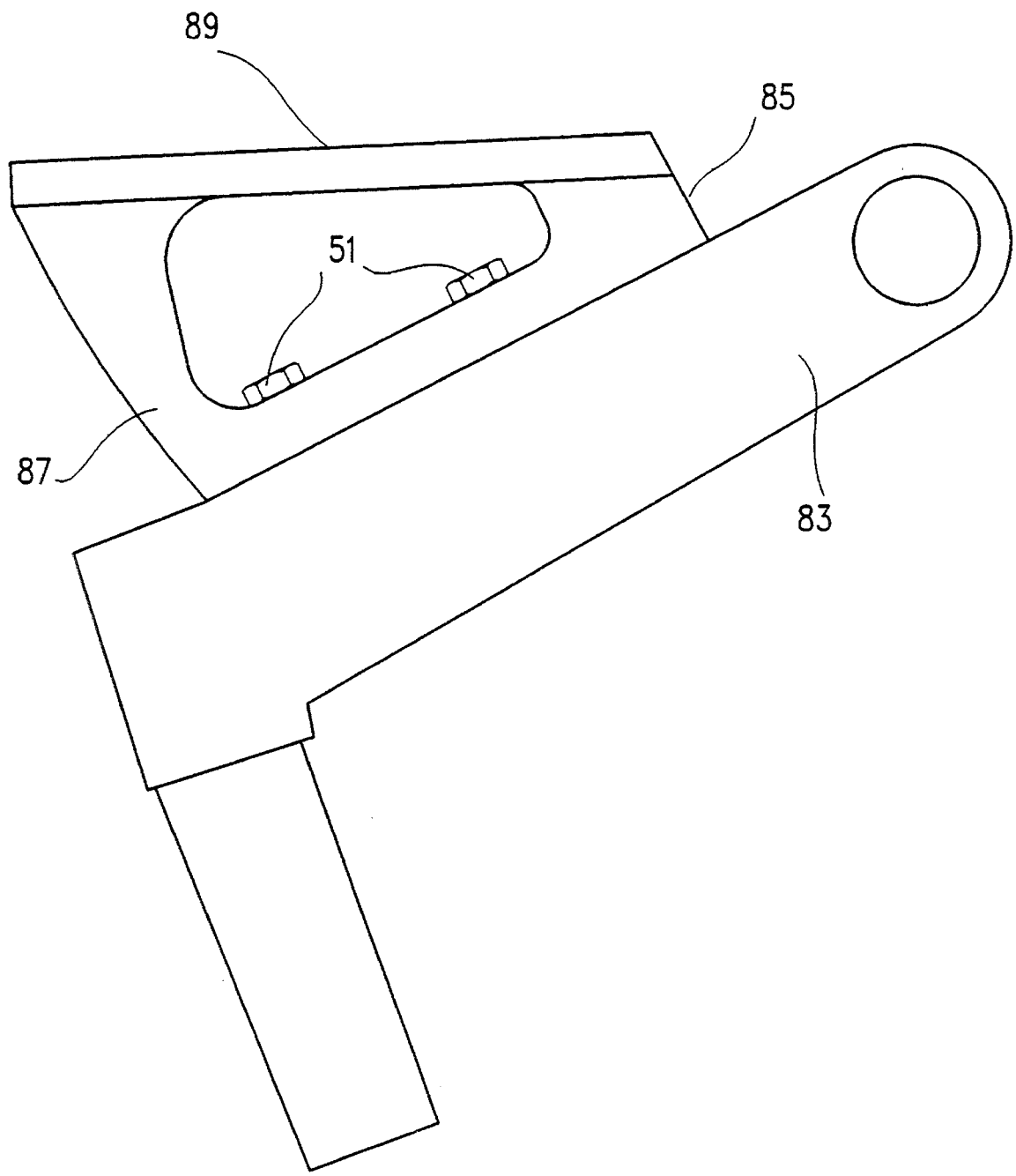
FIG. 7 is a side view of the stem mount and the stem of a bicycle according to the invention.
Figure 8A:
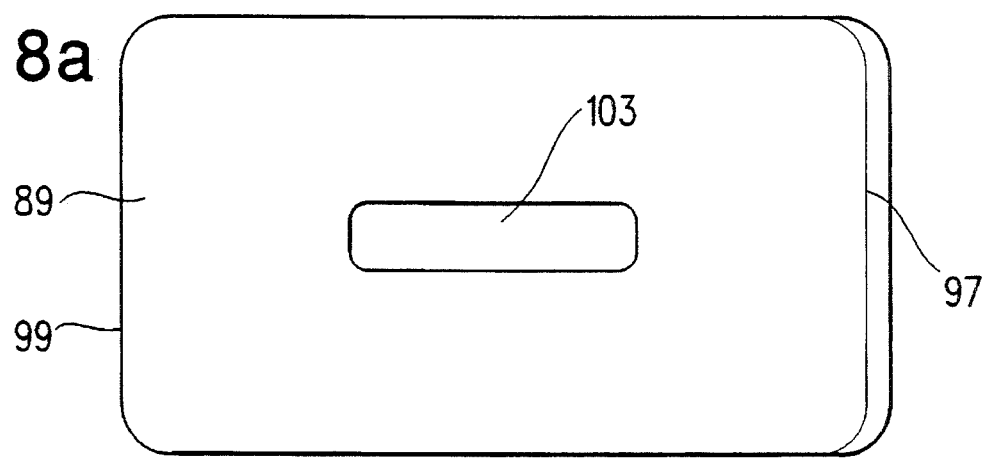
FIG. 8a is a top plan view of the stem mount according to the invention.
Figure 8B:
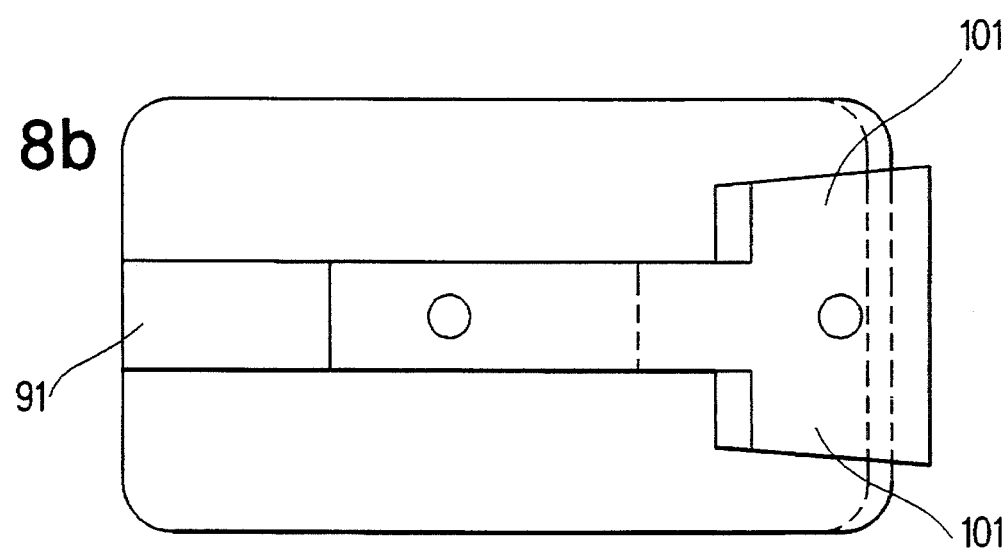
Figure 8C:
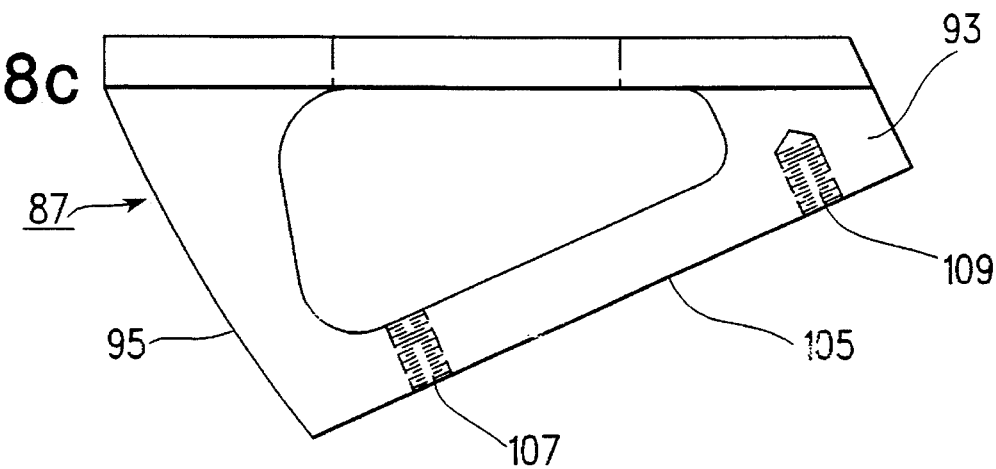

Referring now to FIG. 6 wherein a conventional stem 83 is shown rotatably connected to said steering head 21 at its inner portion and fixedly connected at its outer portion to said handle bars 19, and wherein a stem mount 85 (FIGS. 7, 8a, 8b and 8c) is attached thereto and disposed on the upper surface thereof, which stem mount 85 is adapted for mounting a camera upon its upper side. The stem mount 85 comprises a wedge shaped bracket 87 having a generally horizontally disposed, elongated, upper plate portion 89, a narrow, generally C-shaped lower member 91 having front and rear end portions 93 and 95, respectively, extending from the front and rear sections 97 and 99, respectively, of said plate portion 89, and wherein said front end portion 93 comprises laterally extending side portions 101. The plate portion 89 has formed therein a longitudinally extending slot 103, and disposed between the front and rear portions 93 and 95, respectively, is a central portion 105 having apertures 107 and 109, through which conventional connecting means 51 such as bolts secure the bracket 87 to the stem 83.

Having described this invention what is sought to be protected by Letters Patent is set forth in the following claims.

What is claimed is:

1. A camera mounting assembly for a bicycle having a front portion having a steering head and a rear portion having a seat post, a distance between said steering head and said seat post equal to a length, comprising:

an elongate supporting means having an elongation and having at least a central portion having a length at least equal to said distance between said steering head and said seat post;

support mounting means for fixedly mounting said elongate supporting means on said front portion of said bicycle and substantially horizontally on said bicycle between said steering head and said post seat, said elongate supporting means comprising a rear portion extending rearwardly from said seat post;

a camera mounting means for mounting a camera thereon; and at least one connecting means for selectively securing said camera mounting means on a portion of said elongate supporting means in the direction of elongation of said elongate supporting means.

2. A camera mounting assembly as cited in claim 1, wherein said at least one connecting means secures at least one camera mounting means on said rear portion.

3. A camera mounting assembly as cited in claim 2, wherein said rear portion extends over said rear wheel of said bicycle.

4. A camera mounting assembly for a bicycle having a front portion having a steering head and a rear portion having a seat post, a distance between said steering head and said seat post equal to a length, comprising:

an elongate supporting means having an elongation and having at least a central portion having a length at least equal to said distance between said steering head and said post seat, said elongate supporting means comprises a plurality of beam members, spaced apart and disposed parallel from and to one another, respectively;

support mounting means for fixedly mounting said elongate supporting means on said front portion of said bicycle and substantially horizontally on said bicycle between said steering head and said seat post;

a camera mounting means for mounting a camera thereon; and at least one connecting means for selectively securing said camera mounting means on a portion of said elongate supporting means in the direction of the elongation of said elongate supporting means.

5. A camera mounting assembly as cited in claim 4, wherein said support mounting means comprises a plurality of clamps connected to said beam members, one clamp connected proximate said steering head and another clamp connected proximate said seat post.

6. A camera mounting assembly as cited in claim 4, said camera mounting means comprises a plate member, and wherein said connecting means secures said plate member to said plurality of beam members.

7. A camera mounting assembly as cited in claim 4, further comprising a plurality of stiffeners fixedly connected to said beam members.

8. A stem mount for mounting a camera on a stem of a bicycle comprising:

a generally wedge shaped bracket having a generally horizontally elongated upper plate portion having front and rear sections;

a narrow generally C-shaped member having front and rear end portions extending from said front and rear sections, said front end portion having a length which is less than a length of said rear end portion and said front end portion comprises side portions extending laterally therefrom.

9. A stem mount as recited in claim 8, wherein said generally horizontal elongated upper plate portion has a longitudinally extending slot therein.

10. A stem mount as recited in claim 9, wherein said C-shaped shaped member comprises a central portion extending between said front and rear end portion, said central portion comprises connecting means for fixedly securing said bracket to said stem of said bicycle.

* * * * *